United States Patent [19]
Hasegawa

[11] Patent Number: 5,586,014
[45] Date of Patent: Dec. 17, 1996

[54] FUSE ARRANGEMENT AND CAPACITOR CONTAINING A FUSE

[75] Inventor: Miki Hasegawa, Kyoto, Japan

[73] Assignee: Rohm Co., Ltd., Kyoto, Japan

[21] Appl. No.: 428,889

[22] Filed: Apr. 25, 1995

[30] Foreign Application Priority Data

Apr. 28, 1994 [JP] Japan ................................. 6-092115
Jul. 29, 1994 [JP] Japan ................................. 6-179233

[51] Int. Cl.$^6$ ...................................................... H01G 2/16
[52] U.S. Cl. ............................ 361/534; 361/523; 337/142
[58] Field of Search .................................... 361/435, 534, 361/104, 523, 524, 529, 504, 503; 337/142

[56] References Cited

U.S. PATENT DOCUMENTS

| | | |
|---|---|---|
| 3,882,059 | 5/1975 | Elderbaum . |
| 4,090,231 | 1/1978 | Millard et al. . |
| 4,097,916 | 6/1978 | Piper . |
| 4,106,184 | 8/1978 | Fournier et al. . |
| 4,107,762 | 8/1978 | Shim et al. . |
| 4,319,304 | 3/1982 | Fink . |
| 4,763,228 | 8/1988 | Su ............................................ 361/433 |
| 4,935,848 | 6/1990 | Yamane et al. ......................... 361/534 |
| 5,002,217 | 3/1991 | Tani et al. . |
| 5,027,101 | 6/1991 | Morrill, Jr. . |
| 5,099,397 | 3/1992 | Edson et al. . |
| 5,224,261 | 7/1993 | Morrill, Jr. . |

FOREIGN PATENT DOCUMENTS

| | | |
|---|---|---|
| 0270954 | 6/1988 | European Pat. Off. . |
| 53-157847 | 12/1978 | Japan . |
| 56-92347 | 7/1981 | Japan . |
| 63-170826 | 7/1988 | Japan . |
| 64-22019 | 1/1989 | Japan . |
| 6-252008 | 9/1989 | Japan . |
| 2-105513 | 4/1990 | Japan . |
| 6-252009 | 9/1994 | Japan . |
| 6-252010 | 9/1994 | Japan . |

*Primary Examiner*—Leo P. Picard
*Assistant Examiner*—Anthony Dinkins
*Attorney, Agent, or Firm*—Brumbaugh, Graves, Donohhue & Raymond

[57] ABSTRACT

A fuse arrangement includes a fuse element having a serpentine shape disposed resilient and incombustible or fire-resistant insulating plates and external connection terminals formed at the fuse arrangement. A capacitor has a safety fuse with a fuse element formed between two insulating plates affixed to one end surface of a chip piece of the capacitor so that one end of the safety fuse element is electrically connected to one electrode of the capacitor, and a connection terminal electrode film is formed on the outer surface of the safety fuse body connected to the other end of the safety fuse element.

5 Claims, 10 Drawing Sheets

FUSE ARRANGEMENT AND CAPACITOR CONTAINING A FUSE

BACKGROUND OF THE INVENTION

This invention relates to fuse arrangements for breaking an electric circuit in response to an overcurrent or high temperature or the like and to an electrolytic capacitor containing a fuse.

Conventionally, circuit boards incorporated a fuse arrangement along with other components in order to break the circuit when, for some reason, excess current flows in the circuit, thereby preventing malfunction of the circuit or a resulting disaster such as a fire, or the like.

Figure 23:
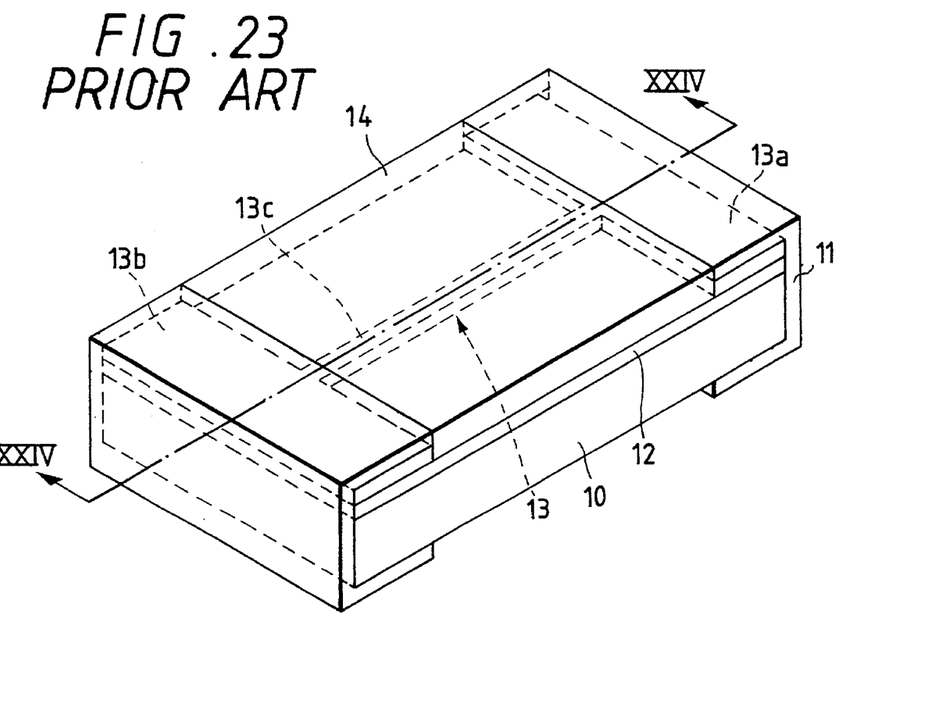
FIG. 23 is a perspective view illustrating a conventional fuse arrangement.
Figure 24:
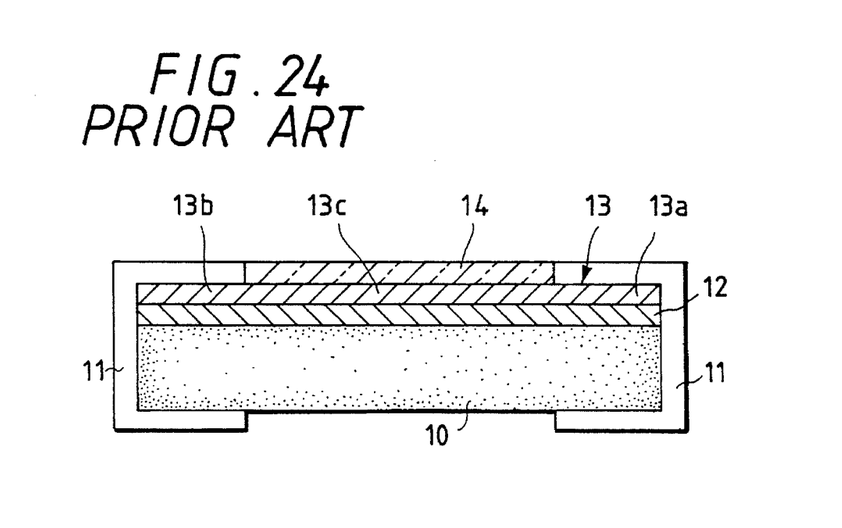
FIG. 24 is a sectional view taken on the line XXIV—XXIV in FIG. 23.

FIGS. 23 and 24 illustrate one such fuse arrangement of this type which is disclosed in Japanese Patent Publication No. Sho-63-170826. In that arrangement, an electrically insulating substrate 10, made of alumina or the like, is provided at opposite sides with a pair of connection terminals 11. An electrical and thermal insulating layer 12 is applied to one surface of the insulating substrate 10 and a fuse member 13 extending between the terminals 11 is formed on the insulating layer 12. The fuse member 13 is made by applying a coating of conductive paste consisting of a mixture of fusible insulating particles, conductive particles and a binder to the layer 12 which is then fired. The insulating layer 12 has the same characteristics as the fusible insulating particles included in the fuse member 13. Thereafter, a glass protective layer 14 is formed over the fuse member 13.

With this fuse arrangement, when the current flowing between opposite ends 13a and 13b of the fuse member 13 exceeds a predetermined level, the fusible conductive and insulating particles of a fuse element 13c are locally melted by the heat produced as a result, and the conductive particles in the fuse element are thus separated and dispersed from each other, so that conductive paths between the conductive particles in the element are destroyed. At this time, since the insulating layer 12 has the same characteristics as that of the fusible insulating particles of the fuse member 13, the molten conductive and insulating particles of the fuse member 13 are dispersed into the insulating layer 12, so that the conductive paths are eliminated quickly and effectively.

Furthermore, the insulating layer 12 has the following additional function. The electrical insulating substrate 10 is made of a ceramic material such as an alumina material, $Al_2O_3$, and the thermal conductivity of such ceramic materials is high enough that the heat resulting from an excessive current in the fuse member 13 is conducted and dispersed through the insulating substrate if the fuse member is formed directly on the insulating substrate. As a result, it is difficult to melt and break the fuse member 13 even if excessive current flows in that member. The electrical and thermal insulating layer 12 prevents heat from the fuse member from being conducted or dispersed into the electrical insulating substrate and into the air. Likewise, the glass protective layer 14 prevents the heat generated in the fuse member from being dispersed into the air.

Figure 25:
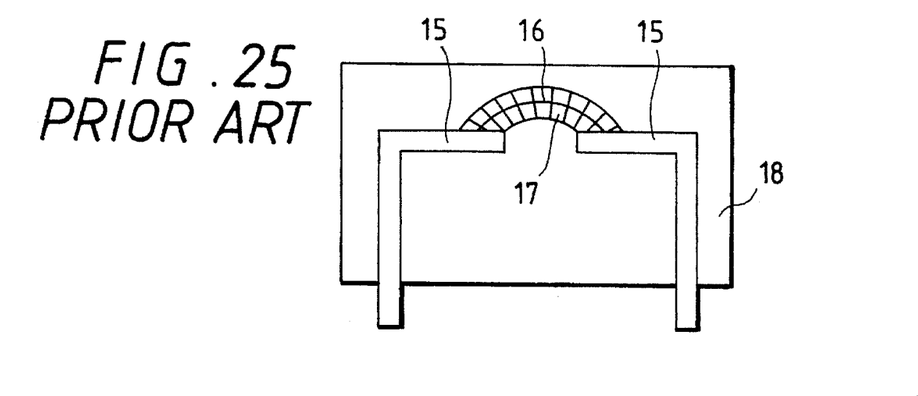
FIG. 25 is a sectional view illustrating another example of a conventional fuse arrangement.

FIG. 25 is a sectional view illustrating the structure of another conventional fuse arrangement which is disclosed in Japanese Unexamined Utility Model Publication No. Sho-56-92347. In that fuse arrangement, a metal wire 16 is connected to the ends of two terminal portions 15 which extend into the fuse body. The metal wire 16 is coated with a resilient and incombustible or fire-resistant resin 17, and the structure is encapsulated within a molded resin casing 18. When the current flowing through the wire 16 between the lead terminals 15 of the fuse body exceeds a predetermined value, the metal wire 16 melts and disintegrates so that the electrical connection between the terminals 15 is broken. The resilient and incombustible or fire-resistant resin 17 enclosing the metal wire 16 is provided so that, when the metal wire 16 is melted and disintegrates, the disintegrated portion of the metal wire 16 is compressed into a compact configuration by surface tension. In addition, the resin casing 18 prevents heat from the metal wire 16 produced by the excess current from being dispersed.

Figure 26:
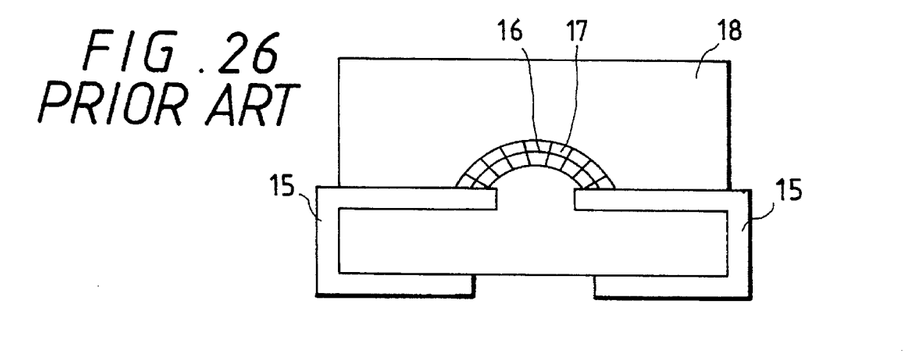
FIG. 26 is a sectional view illustrating a surface mounting type of the conventional fuse arrangement shown in FIG. 25.

The conventional fuse arrangement of the type shown in FIG. 25 may also have a surface-mount type of structure as shown in FIG. 26.

In order to make this type of fuse arrangement operate quickly and effectively when the current flowing therein exceeds a predetermined value, it is necessary to take into account the following two points: (1) The temperature of the fuse element produced by a predetermined current value should always be the same. In other words, the dissipation of heat generated in the fuse element when the current exceeds a predetermined value should be prevented as much as possible in order to keep the breakdown characteristics of the fuse element constant. (2) The fuse element must disintegrate sufficiently at the breakdown temperature that the disintegrated portion of the fuse element cannot return to a connected condition upon solidification.

For this reason, the above-mentioned conventional fuse arrangement includes a thermal and electrical insulating layer between the electrical insulating substrate and the fuse element, a glass protective layer on the fuse element, an encapsulating resin covering the whole fuse, and the like, in order to prevent heat produced by excessive current in the fuse element from being conducted away and dissipated. In addition, in order to make the fuse element disintegrate quickly and effectively, the thermal and electrical insulating layer between the electrical-insulating substrate and the fuse element has the same characteristics as that of fusible insulating particles included in the fuse element and the fuse element is enclosed in a resilient and incombustible or fire-resistant resin, and the like. In such conventional fuses, however, the arrangement for preventing the heat generated by excess current in the fuse element from being conducted away and dispersed, and the arrangement for making the fuse element disintegrate quickly and effectively are provided separately. Accordingly, the number of manufacturing steps is large and the method of manufacturing is complicated so that the manufacturing cost is increased.

Figure 27:
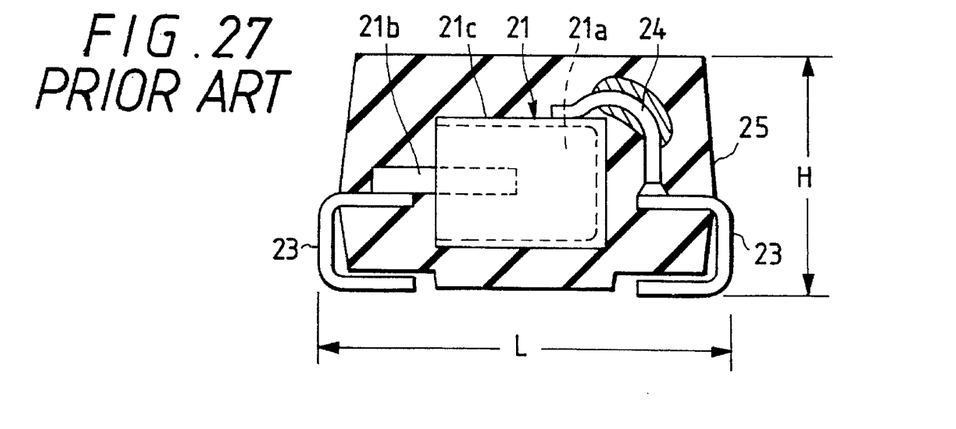
FIG. 27 is a longitudinal sectional view showing a conventional solid electrolytic capacitor.

Furthermore, as shown in FIG. 27, a conventional solid electrolytic capacitor provided with a safety fuse, disclosed in Japanese Unexamined Patent Publication No. Hei-2-105513, is arranged so that a capacitor element 21 consisting of a chip piece 21a and an anode pole 21b projecting away from the chip piece 21a are disposed between a pair of lead terminals 22 and 23 made from metal plates. The anode pole 21b of the capacitor element 21 is attached to an anode lead terminal 22 and after a cathode electrode film 21c has been formed on the outer surface of the chip piece 21a, a cathode lead terminal 23 is connected to the electrode film 21c through a safety fuse wire 24, such as a solder wire or the like. Thereafter, the entire structure is encapsulated in a molded casing 25 consisting of synthetic resin, and the lead terminals 22 and 23 are bent to engage the lower surface side of the resin casing 5.

In this conventional arrangement of a solid electrolytic capacitor with a safety fuse, the total length L thereof includes the length of the capacitor element 21, the length required to connect the lead terminal 22 to the anode pole 21b, and the length required to connect the chip piece 21a of the capacitor element 21 to the lead terminal 23 through the safety fuse wire 24. Similarly, the total height H thereof includes the height of the capacitor element 21 and the height of the safety fuse wire 24 projecting above the upper surface of the capacitor element 21.

Thus, in such a conventional solid electrolytic capacitor arrangement having a safety fuse, the ratio of the length of the capacitor element 21 to the total length L and, the ratio of the height of the capacitor element 21 to the total height H are so small that the ratio of the volume of the capacitor element to the total volume, that is, the volumetric efficiency of the capacitor element, is low. Accordingly, the solid electrolytic capacitor arrangement must be large. In addition, because two lead terminals made from metal plates are included, the weight is excessive.

Furthermore, in manufacturing a conventional solid electrolytic capacitor with a safety fuse as described above, the rate of occurrence of defective products is high, and the manufacturing cost is also quite high because a complex technique is required to connect a safety fuse wire such as a solder wire to a capacitor element and lead terminals.

SUMMARY OF THE INVENTION

Accordingly, it is an object of the present invention to provide a fuse arrangement and a capacitor containing a fuse which overcome the disadvantages of the prior art.

Another object of the invention is to provide a fuse arrangement which can be manufactured more easily and at a lower price than the above-mentioned conventional fuse arrangements while at the same time maintaining the advantages of such fuse arrangements.

These and other objects of the invention are attained by providing a fuse arrangement in which a fuse element having a portion with a serpentine shape is disposed between two insulating plates at least one of which consists of resilient and incombustible or fire-resistant material. The serpentine portion may, for example, have a zigzag shape or it may be shaped like an eddy.

With a fuse portion shaped like an eddy or a zigzag, heat is conducted to a center portion of the fuse element from portions adjacent to the center portion, so that scattered heat can be captured. In addition, once a portion of the fuse element disintegrates, the resilient and incombustible or fire-resistant material forming an insulating plate adjacent thereto moves into the region where the fuse element has disintegrated assuring that the fuse element is broken quickly and effectively. In addition, the insulating plate itself provides a protective layer for the fuse element.

According to the present invention, therefore, a fuse arrangement can be provided by a simple structure in which a fuse element has at least a portion which is shaped in a serpentine path like an eddy or a zigzag and is held between two insulating plates, at lease one of which consists of resilient and incombustible or fire-resistant material. Accordingly, not only is it possible to miniaturize a fuse body which is superior in melting and breakdown characteristics on a large scale, it is also possible to reduce the manufacturing cost of the fuse. Further, the fuse arrangement is so simple that the occurrence of faults during the manufacturing process is extremely low.

In addition, by combining a fuse arrangement according to the present invention with another electronic part such as a solid electrolytic capacitor, it is possible to provide an electronic part containing a safety fuse which is very small in size and light in weight, and which has a very low rate of occurrence of defective products.

In accordance with another aspect of the invention, the electronic component is a solid electrolytic capacitor in which a capacitor element has a chip piece made of hardened metal powder in a porous body, and a safety fuse arrangement in which a safety fuse element is formed between two insulating plates so as to extend along a plane confined between the insulating plates, the safety fuse arrangement being affixed to one end surface of the chip piece of the capacitor so that one end of the safety fuse of the safety fuse body is electrically connected to one of electrodes of the capacitor element. In this arrangement, a connection terminal electrode film for one capacitor electrode is formed on the outer surface of the safety fuse body while another connection terminal electrode film for the other capacitor electrode is formed on the other end surface of the chip piece.

With this arrangement, a solid electrolytic capacitor with a safety fuse can be soldered onto a printed circuit board or the like using two connection terminal electrode films. in addition, even though a safety fuse is included, nothing is added to the height of the capacitor element and only the thickness of a safety fuse body is added to the length of the capacitor element. Accordingly, the ratio of the length of the capacitor element to the total length, and the ratio of the height of the capacitor element to the total height are large so that the volumetric efficiency of the capacitor element can be made substantially higher.

Therefore, according to the present invention, a solid electrolytic capacitor arrangement including a safety fuse can be made not only substantially smaller in size but also substantially lighter.

In addition, according to the present invention, it is not necessary to connect a safety fuse wire such as a solder wire or the like, as in conventional arrangements. Accordingly, both the rate of occurrence of defective products and the manufacturing cost are substantially reduced.

It is also possible to provide safety fuses on both the anode and cathode sides of a solid electrolytic capacitor in accordance with the invention without increasing the size of the solid electrolytic capacitor significantly.

BRIEF DESCRIPTION OF THE DRAWINGS

Further objects and advantages of the invention will be apparent from a reading of the following description in conjunction with the accompanying drawings in which.

DETAILED DESCRIPTION OF PREFERRED EMBODIMENTS

Figure 1:
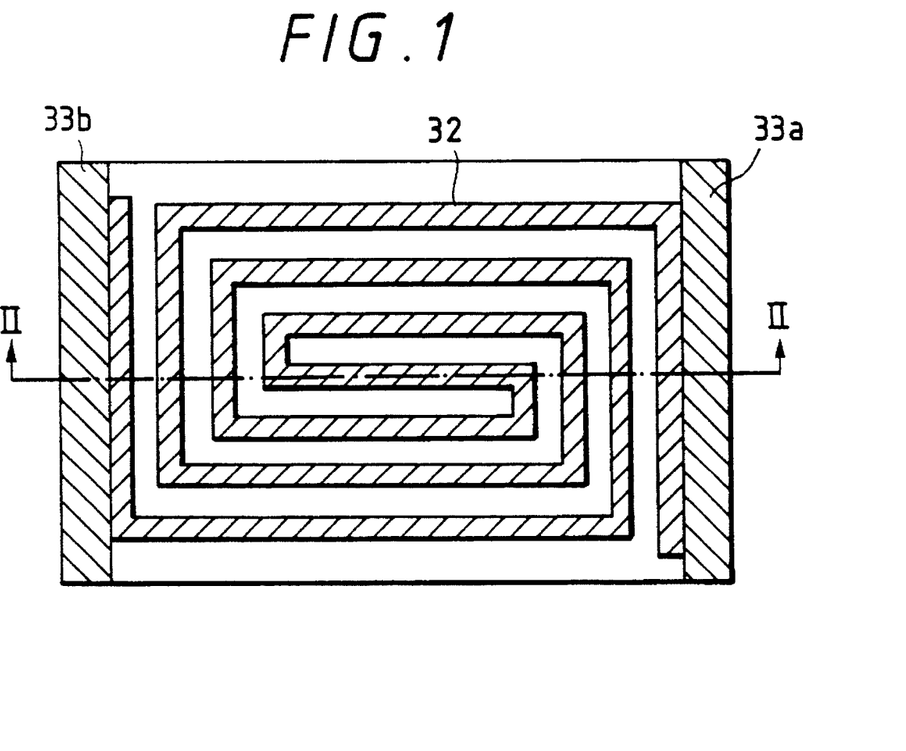
FIG. 1 is a cross-sectional view illustrating the interior arrangement of a representative embodiment of a fuse according to the present invention.
Figure 2:
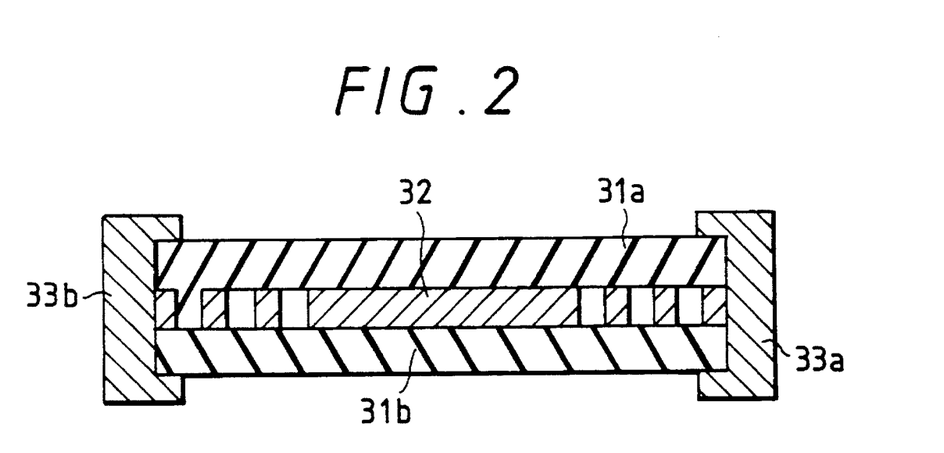
FIG. 2 is a longitudinal sectional view taken on the line II—II in FIG. 1 and looking in the direction of the arrows.
Figure 3:
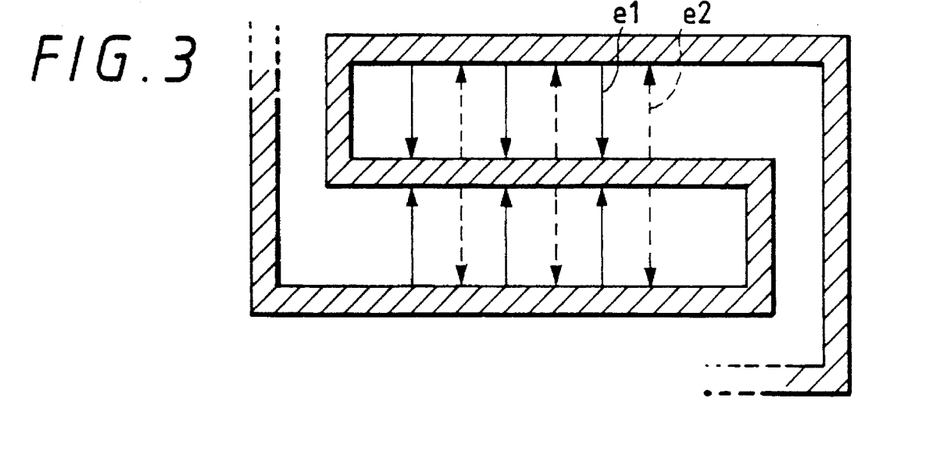
FIG. 3 is an enlarged fragmentary view of the center portion of the fuse arrangement illustrated in FIG. 1.

The typical embodiment of the invention shown in FIGS. 1–3 includes two insulating plates 31a and 31b consisting of resilient and incombustible or fire-resistant silicone rubber and a fuse element 32 having a serpentine shape such as an eddy shape formed between the two insulating plates. For example, the fuse element 32, which is made of a conventional fusible material such as solder selected to melt at a specific elevated temperature, is formed in a predetermined pattern on the surface of one insulating plate 31b by screen printing of a solder paste, or by vacuum deposition of solder, or the like. Alternatively, the fuse element 2 may be formed by depositing a solder film on the surface of the plate 31b and forming the desired pattern from the solder film by photo-etching or the like. The two insulating plates 31a and 31b are then joined together to enclose the fuse element 32. In addition, two external connection electrodes 33a and 33b, which are electrically connected to opposite ends of the fuse element 32 are formed at the edges of the plates 31a and 31b.

In this fuse arrangement, when a current exceeding a predetermined value flows between the two electrodes 33a and 33b through the fuse element 32, the fuse element 32 generates sufficient heat so as to be melted and disintegrate. With a serpentine configuration of the fuse element 32, heat, represented by solid line arrows $e_1$ in FIG. 3, is conducted to a center portion of the fuse element 32 from other portions adjacent to the center portion, and heat emanating from the center portion of the element is captured by the adjacent portions, as shown by the dashed arrows $e_2$ in FIG. 3. As a result, the increased temperature level produced by the heat resulting from an excess current is kept substantially constant in the center portion 2a of the fuse element to thereby assure stable meltdown characteristics of the fuse. Once the fuse portion 2a has been melted by heat generation, the resilient silicone rubber material forming the insulating plates expands into the region where the fuse element has melted, making certain that the molten fuse portion disintegrates quickly and effectively.

Thus, according to the present invention, it is possible to provide a fuse arrangement which is very small in size, and which has superior disintegration characteristics.

Figure 4:
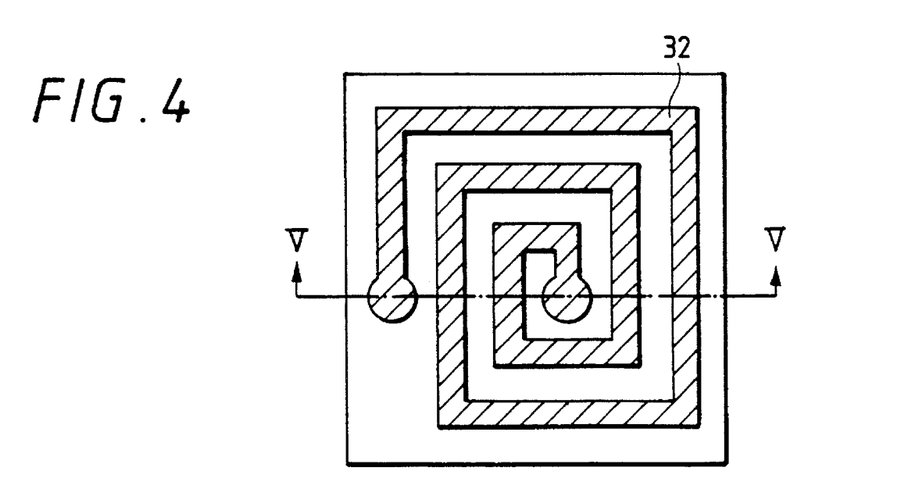
FIG. 4 is a sectional view illustrating the interior of a representative fuse arrangement according to a second embodiment of the present invention.
Figure 5:
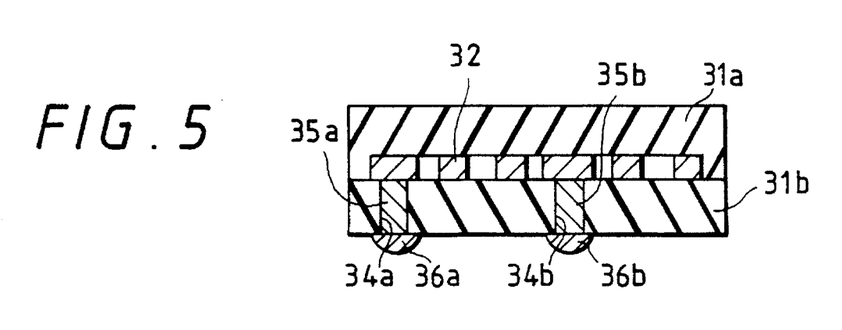
FIG. 5 is a longitudinal sectional view taken on the line V—V in FIG. 4 and looking in the direction of the arrows.

FIGS. 4 and 5 show a second embodiment of the present invention. As in the previous embodiment, the reference numerals 31a and 31b represent insulating plates consisting of silicone rubber, and the numeral 32 represents a fuse element shaped like an eddy. Through holes 34a and 34b are formed in the insulating plate 31b, and conductors 35a and 35b which are electrically connected with the opposite ends of the fuse element 32 extend through these holes. Further, bump electrodes 36a and 36b are formed at the outer ends of the conductors to provide external connection terminals.

FIGS. 6–9 show a third embodiment of the present invention. In this embodiment, a fuse arrangement 38 according to the invention is combined with another electronic part, which in this case is a solid electrolytic capacitor.

Figure 6:
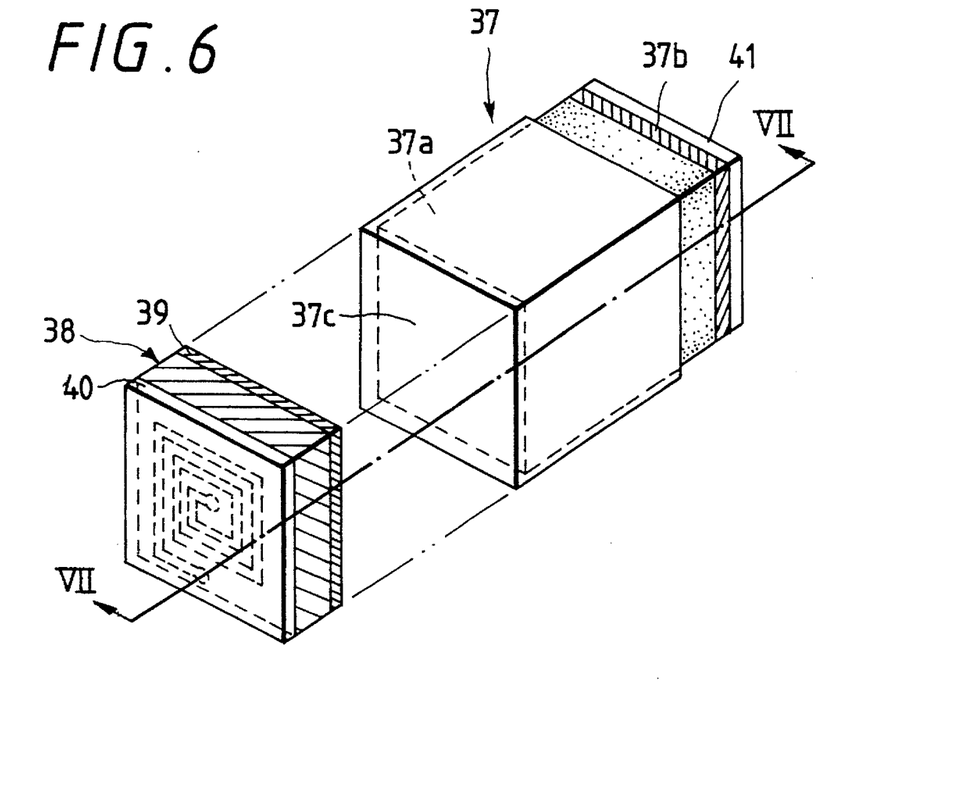
FIG. 6 is an exploded perspective view illustrating a representative solid electrolytic capacitor with a fuse arranged according to a third embodiment of the present invention.
Figure 7:
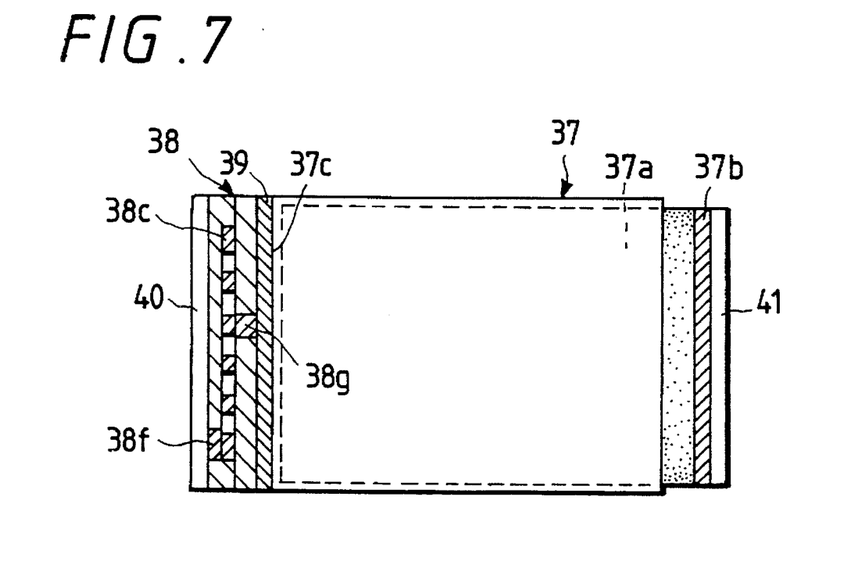
FIG. 7 is a sectional view taken on the line VII—VII in FIG. 6 and looking in the direction of the arrows.

In this embodiment, a capacitor 37 includes a chip piece 37a with an anode electrode film 37b on one end face and a cathode electrode film 37c on the other end face. The chip piece 37a is made by hardening and sintering metal powder into a porous body.

Figure 8:
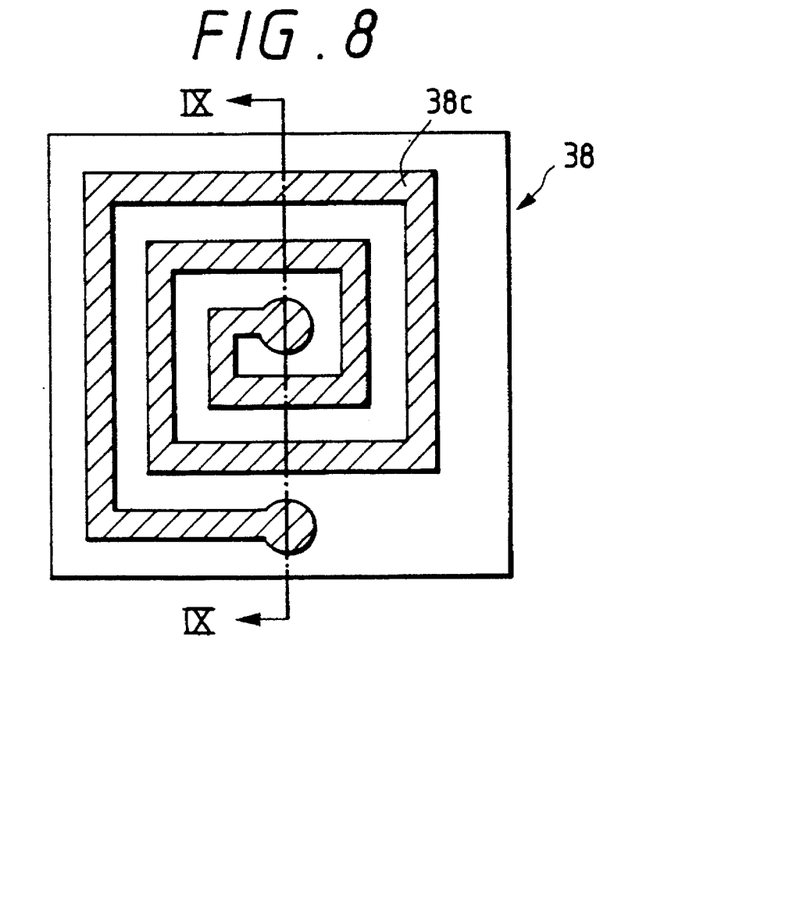
FIG. 8 is a sectional view illustrating the interior of a fuse body according to a third representative embodiment of the present invention.
Figure 9:
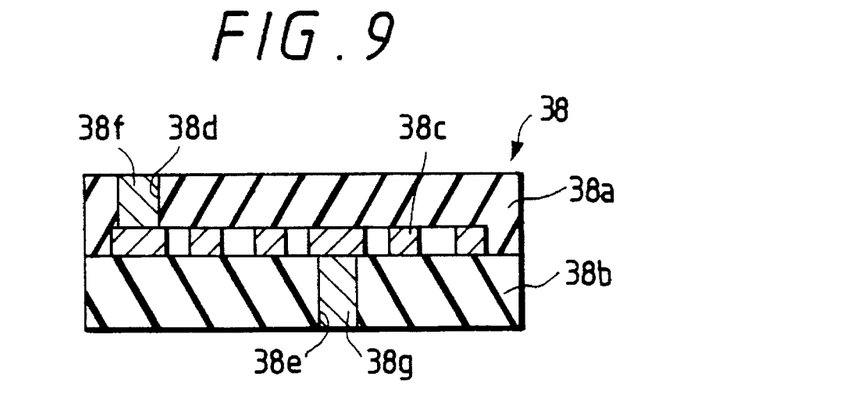
FIG. 9 is a sectional view taken on the line IX—IX in FIG. 8 and looking in the direction of the arrows.

As shown in FIGS. 8 and 9, the fuse arrangement 38 includes a fuse element 38c formed of solder and pressed between two resilient insulating plates 38a and 38b consisting of silicone rubber. A conductor 38f, electrically connected to one end of the fuse element 38c extends through a hole 38d in the insulating plate 38a and another conductor 38g, electrically connected to the other end of the fuse element 38c extends through a hole 38e in the other insulating plate 38b. The fuse arrangement 38 is affixed to the cathode electrode film 37c formed on the end face of the chip piece 37a of the capacitor element 37 with a conductive bonding agent or conductive paste 39 so that the one end of the fuse element 38c of the fuse arrangement 38 is electrically connected with the cathode electrode film 37c through the conductor 38g.

Further, a cathode connection terminal electrode film 40 constituted by a nickel base layer and a solder outer layer, for example, is formed on the outer surface of the fuse arrangement 38 while an anode connection terminal electrode film 41 similarly made of a nickel base layer and a solder outer layer is formed on the surface of the anode electrode film 37b at one end face of the chip piece 37a of the capacitor element 37. In addition, the outer surface of the capacitor element 37 is covered with a coating of heat-resistant synthetic resin or glass, or, alternatively, the outer surface of the capacitor element 37 is encapsulated in a molded body of synthetic resin.

With this arrangement, it is possible to provide an electronic part having a fuse arrangement which can be small in size and manufactured at a low cost.

Although two insulating plates both consisting of resilient and incombustible or fire-resistant silicone rubber are included in the above-described representative embodiments, any other substrate such as an alumina substrate, a glass substrate, a heat-resistant resin substrate of synthetic resin such as butadiene rubber, or the like, may be used as one of the insulating plates. When both insulating plates are formed of resilient and incombustible or fire-resistant resin, such as silicone rubber, or in the case where one of the plates is formed of a glass substrate or any resin substrate which is heat-resistant or regenerative, heat can be more effectively prevented from dissipating than in the case where one of the insulating plates is made of an alumina substrate. Consequently, it is possible to provide a fuse which operates with a high degree of accuracy.

In the above-described embodiments, the fuse arrangement also acts as a high temperature safety device when a low melting point conductive substance such as solder or the like, is used for the fuse element.

In the further embodiment of the invention shown in FIGS. 10–14, a capacitor element 51 has a chip piece 51a which is formed by hardening and sintering metal powder into a porous body, an anode electrode film 51b formed on one end surface of the chip piece, and a cathode electrode film 51c formed on the other end surface of the chip piece.

Figures 13, 14, 15:
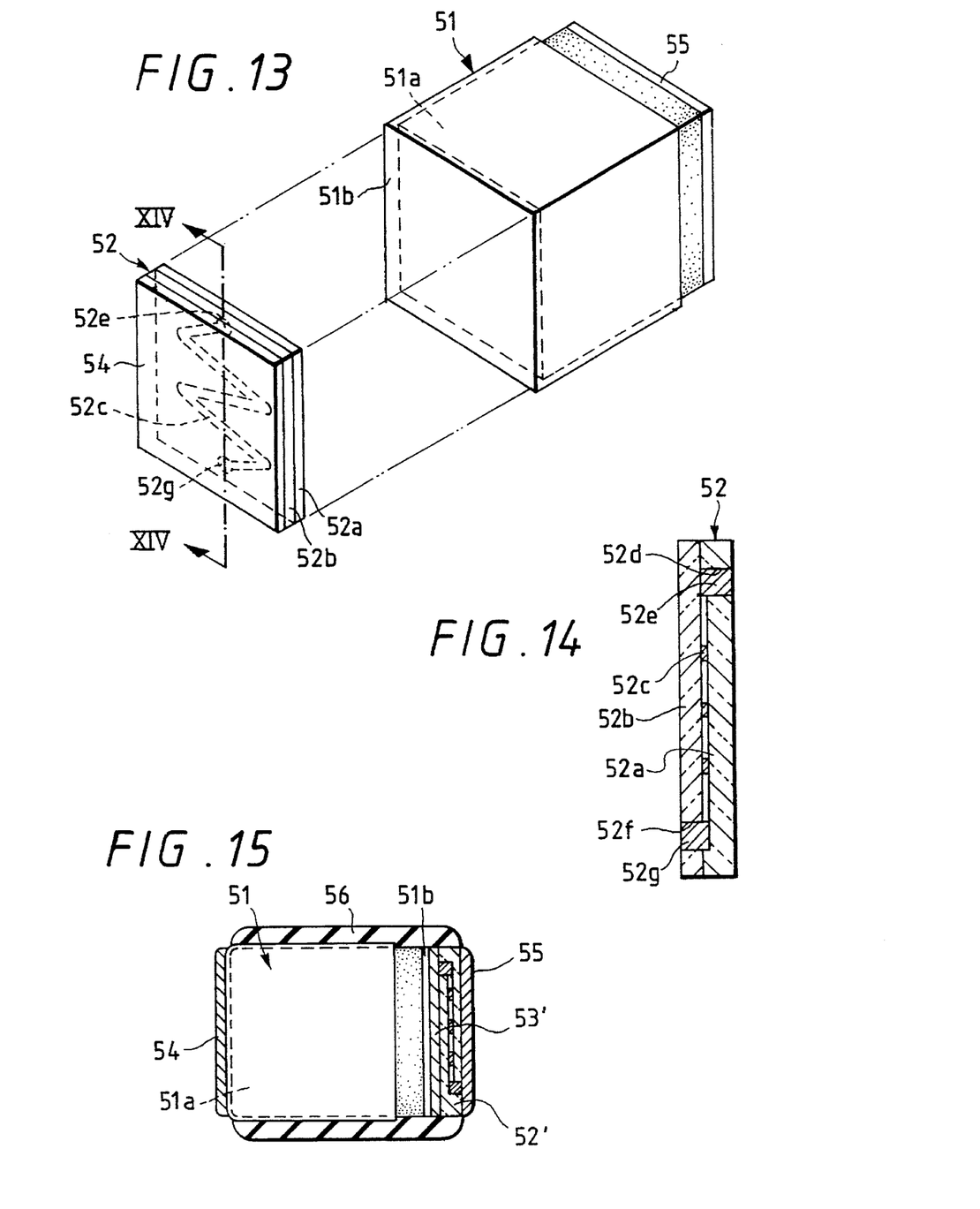
FIG. 13 is an exploded perspective view illustrating a typical solid electrolytic capacitor having a fuse according to an additional embodiment of the present invention.
FIG. 14 is an enlarged sectional view taken on the line XIV—XIV in FIG. 13 and looking in the direction of the arrows.
FIG. 15 is a longitudinal sectional view showing a solid electrolytic capacitor having a fuse according to still another embodiment of the present invention.

As shown in FIGS. 13 and 14, a safety fuse arrangement 52 includes a safety fuse element 52c sandwiched between two insulating plates 52a and 52b so as to extend along the plane joining the insulating plates 52a and 52b. In addition, a conductor 52e, electrically connected to one end of the safety fuse element 52c extends through a hole 52d in one insulating plate 52a and another conductor 52g, electrically connected to the other end of the safety fuse element 52c, extends through a hole 52f in the other insulating plate 52b.

Figure 10:
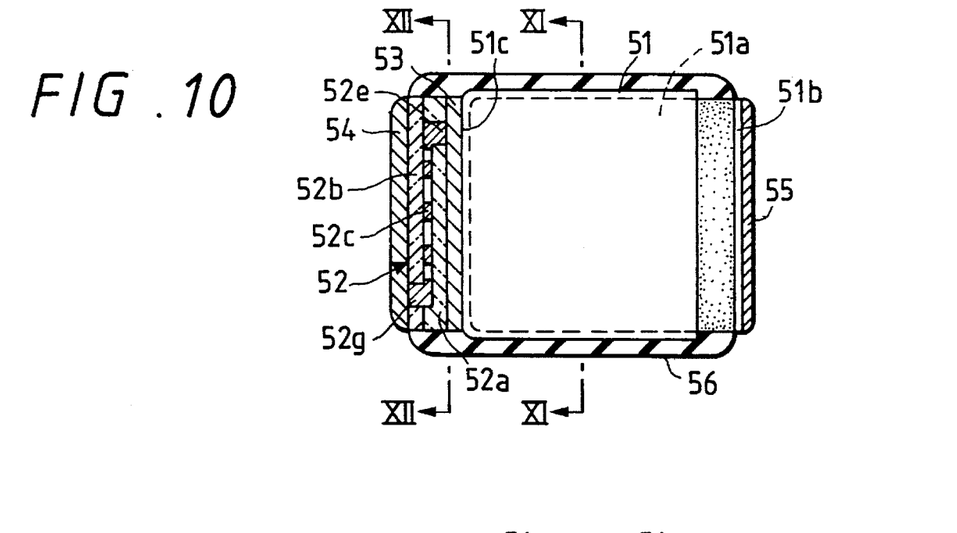
FIG. 10 is a longitudinal sectional view showing a representative electrolytic capacitor having a fuse according to a further embodiment of the present invention.
Figure 11:
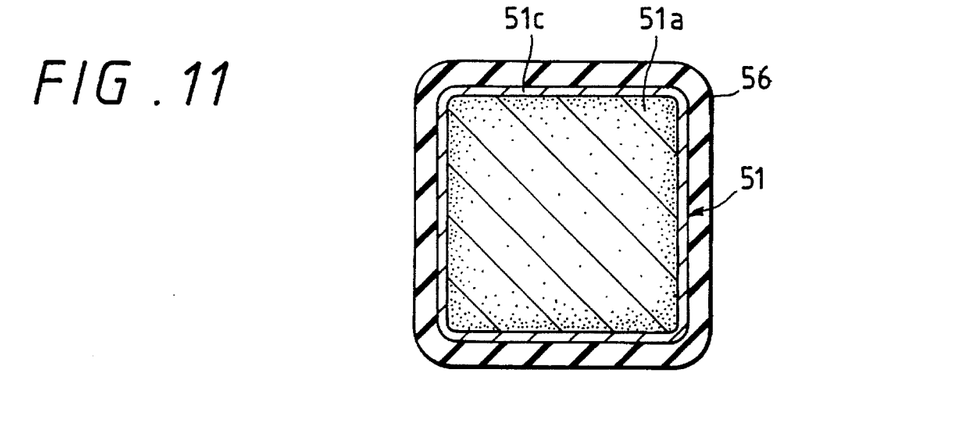
FIG. 11 is a sectional view taken on the line XI—XI in FIG. 10 and looking in the direction of the arrows.
Figure 12:
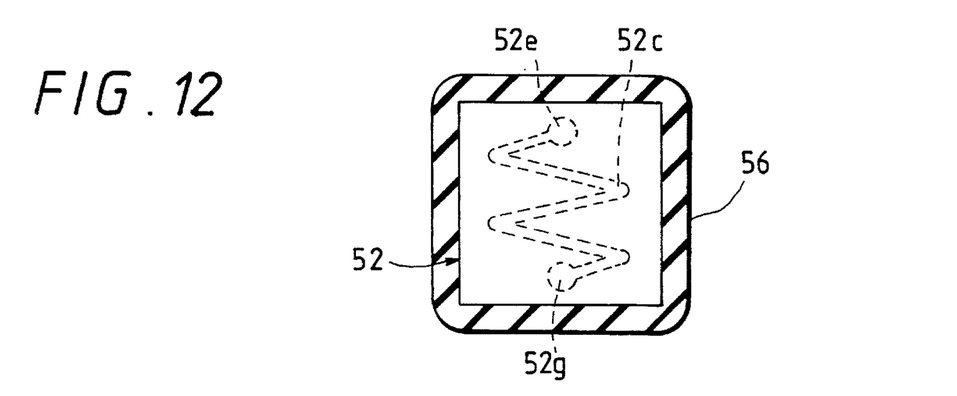
FIG. 12 is a sectional view taken on the line XII—XII in FIG. 10 and looking in the direction of the arrows.

This safety fuse arrangement is affixed to the cathode electrode film 51c formed on the end surface of the chip piece 51a of the capacitor element 51 using a conductive bonding agent or conductive paste 53 so that one end of the safety fuse element 52c in the safety fuse arrangement 52 is in electrical contact with the cathode electrode film 51c through the conductor 52e.

Further, a cathode connection terminal electrode film 54 made, for example, from a metal film consisting of a nickel base layer and a solder outer layer is formed on the outer surface of this safety fuse arrangement 52. Similarly, an anode connection terminal electrode film 55 made from a metal film constituted by a nickel base layer and an outer solder layer is formed on the surface of the anode electrode film 51b on the other end surface of the chip piece 51a of the capacitor element 51.

A protective layer 56 of heat-resistant synthetic resin or glass is applied to the outer peripheral surface of the capacitor element 51 so as to cover the whole of the peripheral surface. Instead of this protective layer 56, the peripheral surface of the capacitor element 11 may be encapsulated in a molded body of synthetic resin.

This solid electrolytic capacitor arrangement can be soldered onto a printed circuit board or the like through the anode connection terminal electrode film 55 and the cathode connection terminal electrode film 54. Moreover, in spite of inclusion of the safety fuse element 52c in the capacitor arrangement 51, nothing is added to the height of the capacitor arrangement 51 and only the thickness of the safety fuse body 52 is added to the length of the capacitor arrangement 51. Accordingly, the ratio of the length of the capacitor 51 to the total length of the arrangement and the ratio of the height of the capacitor 51 to the total height is large, so that the volumetric efficiency of the capacitor arrangement is very high.

Although the foregoing embodiment has the safety fuse arrangement 52 located on the cathode end of the capacitor 51, a safety fuse arrangement 52' configured in the same manner described above may be affixed to the anode end of a capacitor 51 with a conductive bonding agent or conductive paste 53, so that an anode connection terminal electrode film 55 is formed on the surface of this safety fuse body 52' while a cathode connection terminal electrode film 54 is formed on a cathode electrode film 51c on the other end surface of a chip piece 51a. This arrangement is shown in FIG. 15. In this embodiment, the cathode electrode film 51c of the chip piece 51a may be used as the cathode connection terminal electrode film 54.

Figure 16:
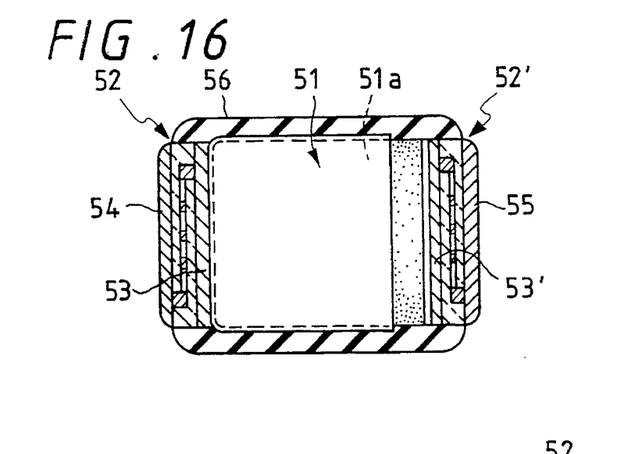
FIG. 16 is a longitudinal sectional view showing a typical solid electrolytic capacitor having two fuses according to an additional embodiment of the present invention.

In a further embodiment shown in FIG. 16, safety fuse arrangements 52 and 52' having the structure described above are affixed to both the cathode and anode ends of a capacitor element 51 using conductive bonding agents or conductive paste 53 and 53', respectively. Thus, an anode connection terminal electrode film 55 is formed on the surface of one of these safety fuse bodies 52 and 52', for example, the safety fuse body 52', while a cathode connection terminal electrode film 54 is formed on the surface of the other safety fuse arrangement 52. Accordingly, it is possible to provide safety fuse arrangements on both the anode and cathode ends of a solid electrolytic capacitor without making the solid electrolytic capacitor significantly larger.

The safety fuse 52 having the foregoing arrangement is manufactured in the following manner.

Figure 17:
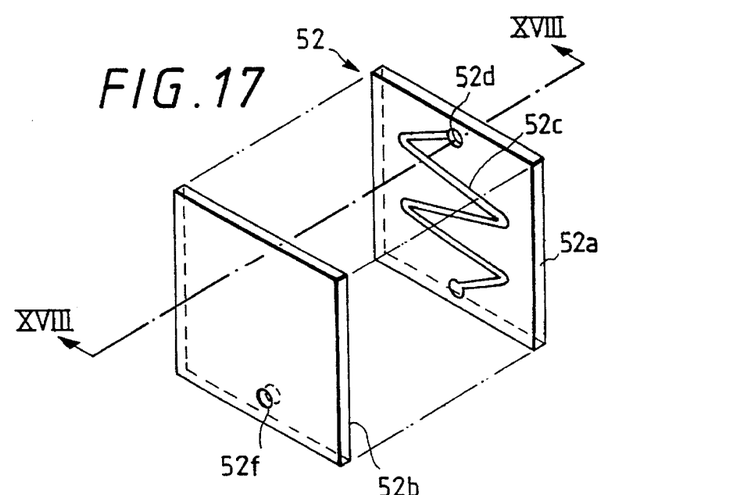
FIG. 17 is an exploded perspective view showing a safety fuse arrangement for use in a capacitor element according to the present invention.
Figure 18:
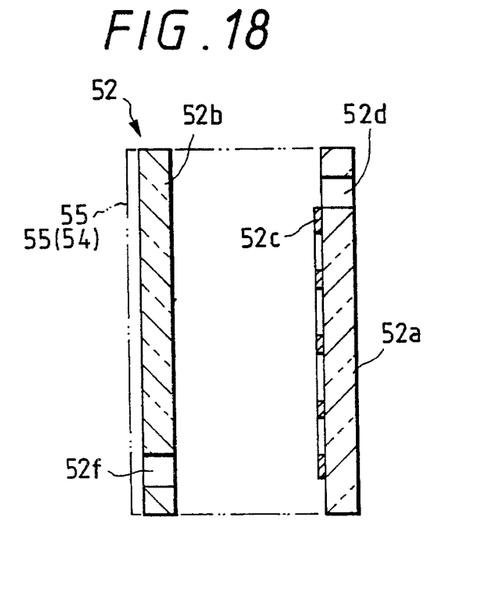
FIG. 18 is a sectional view taken on the line XVIII—XVIII in FIG. 17.

The pattern of the safety fuse 52c, as shown in FIGS. 17 and 18, is formed on the surface of one of the insulating plates 52a and 52b, for example, the insulating plate 52a, by screen printing of solder paste, or by vacuum deposition of solder, or the like. After the other insulating plate 52b is positioned against the insulating plate 52a and joined to it, conductors of solder paste or the like are inserted into the through holes 52d and 52f in the insulating plates 52a and 52b respectively.

Alternatively, the pattern of the safety fuse element 52c may be produced from a solder film layer by photo-etching or the like. In this case, after the pattern has been produced, it is sandwiched between the two insulating plates 52a and 52b and conductors made of solder paste or the like are inserted into the through holes 52d and 52f in the insulating plates 52a and 52b respectively.

Although the safety fuse arrangement 52 described above may be affixed as it is onto the capacitor element 51 before the anode connection terminal electrode film 55 or the cathode connection terminal electrode film 54 is formed on the outer surface of this safety fuse arrangement 52, the safety fuse 52 may be affixed to the capacitor element 51 after the anode connection terminal electrode film 55 or the cathode connection terminal electrode film 54 is formed on the outer surface of the safety fuse 52 as indicated by the two-dotted chain line in FIG. 18.

In manufacturing a capacitor element by forming the anode electrode film 51b on one end surface of the chip piece 11a and the cathode electrode film 51c on the other end surface, the method disclosed in Japanese Patent Applications Nos. Hei-5-38166, Hei-5-38167 and Hei-5-38168 may be used as described hereinafter.

Figure 19:
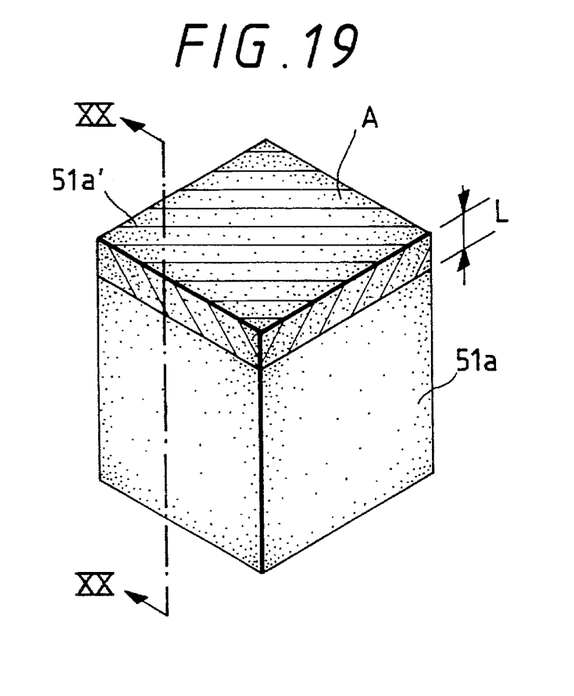
FIG. 19 is a perspective view illustrating a chip piece for a capacitor element used in the present invention.
Figure 20:
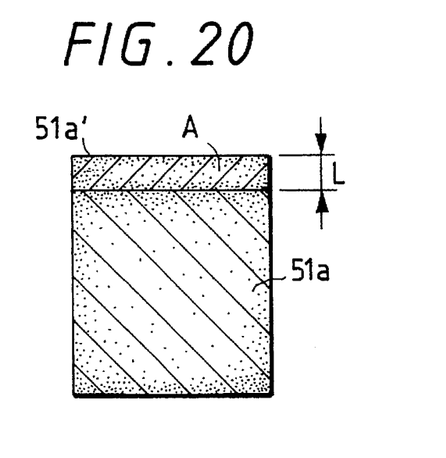
FIG. 20 is a sectional view taken on the line XX—XX in FIG. 19.

As shown in FIGS. 19 and 20, one end surface 51a' of a chip piece 51a, which is formed by hardening and sintering metal powder such as tantalum or the like into a porous body, is infused with a synthetic resin, or dressed closely and tightly with metal powder or bonded to a metal piece, so as to provide a non-porous portion A of desired length L. Anodic oxidation is carried out as the chip piece 51a is soaked in a chemical liquid such as a phosphoric acid solution or the like, so as to form a dielectric film of tantalum pentoxide or the like on the surface of the chip piece 51a other than the non-porous portion A. Next, the chip piece 51a is soaked in a manganese nitrate solution and then removed and sintered. This process is repeated many times, so that a solid electrolytic layer of manganese dioxide or the like is formed on the surface of the dielectric film of tantalum pentoxide with the solid electrolytic layer surface 51a' being insulated from the metal powder of the chip piece 51a by the presence of the non-porous portion A.

Figure 21:
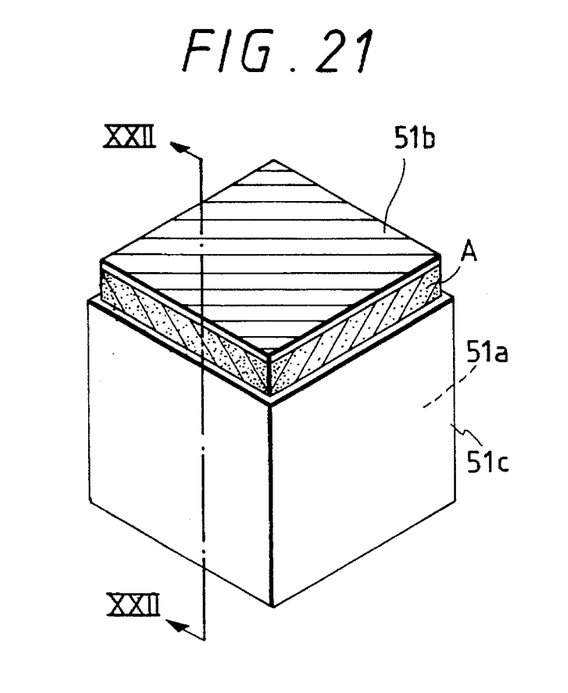
FIG. 21 is a perspective view of a typical capacitor element for use in the present invention.
Figure 22:
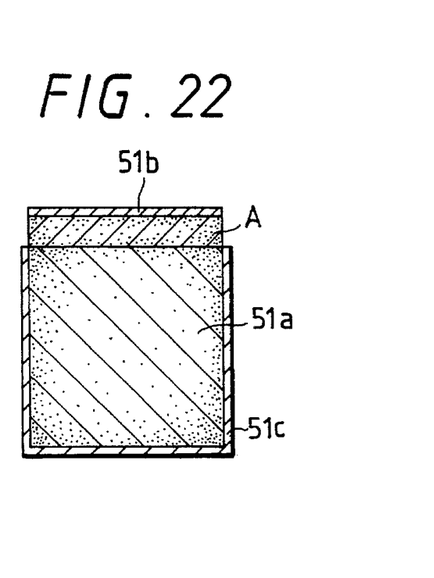
FIG. 22 is a sectional view taken on the line XXII—XXII in FIG. 21.

Next, as shown in FIGS. 21 and 22, after the foregoing surface treatment has been carried out, the metal powder in the non-porous portion A having the end surface 51a' projects from the chip piece 51a. An anode electrode film 51b is then formed on the end surface 51a' while a cathode electrode film 51c, including a graphite layer and a metal layer of silver, nickel or the like is formed on the outer surface of the chip piece 51a, except for the non-porous portion A. If desired, the anode electrode film 51b may be formed after the cathode-side electrode film 51c is formed.

Consequently, the capacitor element 51 can be manufactured in a form in which the anode electrode film 51b is formed on one end surface 51a' of the chip piece 51a while the cathode electrode film 51c is formed on the other end surface. When a safety fuse arrangement 52 is affixed only to the cathode side of the capacitor element 51, as in the embodiment shown in FIG. 10, it is not necessary to form the anode electrode film 51b on one end surface 51a' of the chip piece 51a of the capacitor element 51. Instead, the above-mentioned anode connection terminal electrode film 55 may be formed directly on the end surface 51a'.

Although the invention has been described herein with reference to specific embodiments, many modifications and variations therein will readily occur to those skilled in the art. Accordingly, all such variations are included within the intended scope of the invention.

I claim:

1. A fuse arrangement comprising a fuse element having a serpentine shape and two insulating plates, at least one of which is resilient and made of incombustible or fire-resistant material, disposed on opposite sides of the fuse element, the two insulating plates having facing surfaces and the serpentine shape of the fuse element being disposed between the facing surfaces of the insulating plates.

2. A fuse arrangement according to claim 1 wherein the fuse element has an eddy-like shape.

3. A fuse arrangement according to claim 1 wherein the fuse element has a zigzag shape.

4. A solid electrolytic capacitor having a safety fuse comprising a capacitor body including a chip piece formed of a porous body made of hardened metal powder and two electrodes, and a safety fuse arrangement including a safety fuse element disposed between two insulating plates having facing surfaces, the safety fuse element having a serpentine shape disposed between the facing surfaces of the insulating plates, the safety fuse arrangement being affixed to one end surface of the chip piece and one end of the safety fuse element being electrically connected to one of the electrodes of the capacitor, and a connection terminal electrode film formed on the outer surface of said safety fuse, the other end of the safety fuse element being electrically connected to the connection terminal electrode film.

5. A solid electrolytic capacitor comprising a capacitor body including a chip piece formed of a porous body made of hardened metal powder and two electrodes, and two safety fuse arrangements, each including a safety fuse element disposed between two insulating plates having facing surfaces, the safety fuse element having a serpentine shape disposed between the facing surfaces of the insulating plates, each of said safety fuse arrangements being affixed to a corresponding end surface of the chip piece of the capacitor body with one end of the safety fuse element therein being electrically connected to a corresponding electrode of the capacitor, each safety fuse arrangement having a connection terminal electrode film formed on an outer surface of the safety fuse arrangement which is electrically connected to the other end of the safety fuse element therein.

\* \* \* \* \*